(12) United States Patent
Easley

(10) Patent No.: US 7,958,599 B2
(45) Date of Patent: Jun. 14, 2011

(54) SNAP ASSEMBLY FRICTION HINGE

(76) Inventor: James B. Easley, Orono, MN (US)

( * ) Notice: Subject to any disclaimer, the term of this patent is extended or adjusted under 35 U.S.C. 154(b) by 352 days.

(21) Appl. No.: 12/371,402

(22) Filed: Feb. 13, 2009

(65) Prior Publication Data
US 2009/0205167 A1    Aug. 20, 2009

Related U.S. Application Data

(60) Provisional application No. 61/028,592, filed on Feb. 14, 2008.

(51) Int. Cl.
*E05D 7/00* (2006.01)
(52) U.S. Cl. ............ 16/224; 16/385; 403/122; 384/206; 264/242
(58) Field of Classification Search .............. 16/224, 16/225, 385, 273, 275, 276; 403/122, 127, 403/132, 133, 135, 140; 29/458, 11, 898.09, 29/898.13; 384/206, 209–211; 264/130, 264/131, 242, 257, 328.1
See application file for complete search history.

(56) References Cited

U.S. PATENT DOCUMENTS

| | | | |
|---|---|---|---|
| 1,868,891 A | | 4/1929 | Faudi |
| 2,610,355 A | * | 9/1952 | Becker ............... 16/224 |
| 3,108,830 A | * | 10/1963 | Fierstine ............ 403/140 |
| 3,348,864 A | | 10/1967 | Ulderup ............ 403/77 |
| 3,355,787 A | * | 12/1967 | Sullivan, Jr. ......... 29/898.049 |
| 3,843,272 A | * | 10/1974 | Jorn ............... 403/132 |
| 4,193,707 A | * | 3/1980 | Doden ............. 403/140 |
| 4,504,165 A | | 3/1985 | Moeremans |
| 4,606,668 A | | 8/1986 | Schmidt |
| 4,701,990 A | | 10/1987 | Kehl et al. |
| 5,092,703 A | | 3/1992 | Kobayashi |
| 5,372,446 A | | 12/1994 | Chamberlin |
| 5,407,288 A | | 4/1995 | Watanabe |
| 5,427,467 A | * | 6/1995 | Sugiura ............ 403/140 |
| 5,676,484 A | | 10/1997 | Chamberlin et al. |
| 5,746,548 A | | 5/1998 | Crandall |
| 5,772,337 A | * | 6/1998 | Maughan et al. ...... 384/206 |
| 5,876,149 A | | 3/1999 | Dorr et al. |
| 5,904,436 A | * | 5/1999 | Maughan et al. ...... 403/140 |
| 6,496,589 B1 | | 12/2002 | Pham et al. |
| 6,514,443 B1 | * | 2/2003 | Dorr ............... 264/130 |
| 6,802,275 B2 | | 10/2004 | Schmidt |
| 6,840,487 B2 | | 1/2005 | Carnevali |
| 6,902,344 B2 | * | 6/2005 | Raak et al. ........... 403/135 |
| 6,902,345 B2 | | 6/2005 | Kur |
| 2003/0180089 A1 | * | 9/2003 | Heuser et al. ......... 403/135 |
| 2008/0023606 A1 | | 1/2008 | Kalis et al. |
| 2008/0138150 A1 | * | 6/2008 | Budde et al. ......... 403/135 |

* cited by examiner

*Primary Examiner* — Chuck Y. Mah
(74) *Attorney, Agent, or Firm* — Shewchuk IP Services, LLC; Jeffrey D. Shewchuk

(57) ABSTRACT

A friction hinge includes a socket made up of a compressible elastomer insert sleeve inside a relatively rigid cup substrate. The insert sleeve defines an opening with a lip around the opening, and a relatively rigid ball or other center portion can be snap assembled through the lip and opening to center itself in the socket. A mount portion extends through the opening off the ball/center portion, and hand pressure on the mount portion can adjust the angular position of the joint. The size of the ball/center portion relative to the size of the cup substrate causes dimensional compression of the insert sleeve, such as about 15% of its thickness. The compression of the insert sleeve creates a controlled friction force on the ball/center portion, so the snap assembly friction hinge works consistently over a long time and over wide temperature ranges.

16 Claims, 3 Drawing Sheets

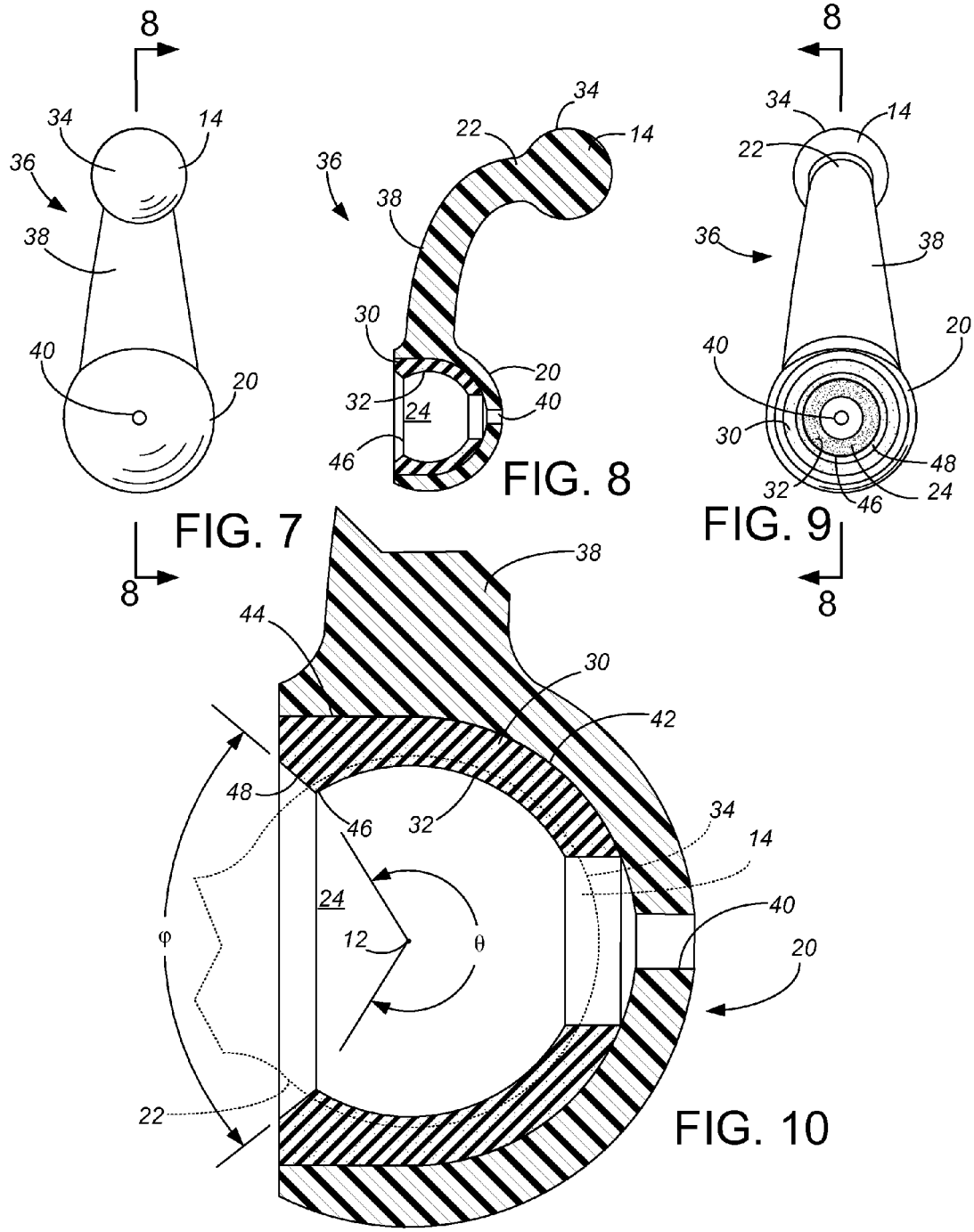

SNAP ASSEMBLY FRICTION HINGE

CROSS-REFERENCE TO RELATED APPLICATION(S)

This application claims priority from Provisional Application No. 61/028,592, filed Feb. 14, 2008, entitled SNAP ASSEMBLY FRICTION HINGE.

BACKGROUND OF THE INVENTION

The present invention relates to mounting structures, and particularly mounting structures which allow freedom of pivoting movement which can be hand-controlled and positioned at a desired orientation. Such mounting structures find particular applications in vehicles for mounting rear view mirrors or electronic screen devices to the vehicle, for ready hand positioning by the driver or passenger to a different orientation for viewing.

Numerous situations exist where devices are mounted so as to be hand positionable about a pivot point 12. One common situation is in a vehicle. The driver of the vehicle typically has at least one, and more commonly several, rear view mirrors. Because drivers differ in height and driving body positioning and may differ in what area they exactly wish to see in the rear view mirror, the rear view mirrors commonly include a ball-and-socket type of friction hinge to allow angular repositioning of the mirror. Other screen devices, such as GPS devices, PDA devices, etc., are also commonly mounted to a dashboard of the vehicle on a ball-and-socket type of friction hinge. The term "friction hinge", as used herein, denotes that the hinge is not free swinging but rather involves a friction force which ordinarily keeps the hinge angle from moving, but which friction force can be overcome by hand pressure when the user desires to position the supported item (electrical component or mirror) at a different angular position.

Such friction hinges have a variety of design constraints and goals. They must be sturdy and robust, to support the weight of the mirror or other device being supported and to withstand not only the forces of repeated repositionings, but also substantially larger forces which may occur when the device is inadvertently bumped (such as when loading something into the vehicle). They must be able to provide the correct amount of friction force so as not to be too "tight" or too "loose" for hand positioning, while not slipping during vibration such as when the vehicle is travelling over bumpy roads. The friction hinge structures must be able to retain their ease of functionality over years or decades of use. Further, particularly because vehicle interiors can be subject to tremendous temperature swings, such as temperature differences in excess of 100° F. between winter and summer use, the friction force must remain relatively constant over a very wide temperature range. The mounts should also be low in cost. They should be easy to assemble, either in manufacture of the vehicle or later when adding an aftermarket mirror or device to the vehicle.

Many ball-and-socket joints include a socket which is either finally assembled or formed only after the ball is in place. Obviously, the final assembly or formation adds a manufacturing or assembly step which would preferably be avoided. Further, many ball-and-socket joints do not permit disassembly, which would be beneficial particularly in instances when the device being held is also used outside the vehicle, or is frequently replaced.

Another style of ball-and-socket friction hinge can be assembled quickly and easily by snapping the ball into the socket after the socket has been fully assembled or formed. To facilitate such snap assembly, often either the socket or ball (or both) is made up of multiple different portions or arms which can bend or move relative to one another. A prior art example of such a mounting or snap assembly friction hinge is shown in U.S. Pat. No. 7,296,771, incorporated by reference, and the present invention is particularly contemplated as an improvement over the type of snap assembly friction hinge taught in U.S. Pat. No. 7,296,771. The movement of the arms causes a bending stress point which can deteriorate or break, leading to a failure of the joint. Better methods and structures of friction hinges are needed.

BRIEF SUMMARY OF THE INVENTION

The present invention is a friction hinge as well as a method of manufacturing and assembling that friction hinge. The friction hinge includes a compressible elastomer insert sleeve and a relatively rigid cup substrate around the insert sleeve. The insert sleeve defines an opening with a lip around the opening, and a relatively rigid ball or other center portion can be snapped through the lip and opening to center itself relative to the cup substrate. A mount portion extends through the opening off the ball/center portion, and hand pressure on the mount portion can adjust the angular position of the joint. The size of the ball/center portion relative to the size of the cup substrate causes dimensional compression of the insert sleeve, and the compression of the insert sleeve creates a controlled friction force on the ball/center portion.

The friction hinge is particularly contemplated as a mount for holding devices such as electrical components or mirrors at a hand-selected angular position, in a vibration environment which may undergo significant changes in temperature, such as in a vehicle. While the snap assembly friction hinge of the present invention has attributes making it appropriate for use in mounting items in vehicles, use of the hinge is not limited to temperature cycling environments or vibration environments.

BRIEF DESCRIPTION OF THE DRAWINGS

FIG. 7 is a top plan view of the intermediate component of FIGS. 3-6.

FIG. 8 is a bottom view of the intermediate component of FIGS. 3-7.

FIG. 9 is a cross-sectional view of the intermediate component taken at line 8-8 of FIGS. 7 and 8.

FIG. 10 is an enlarged cross-sectional view of the socket part of the intermediate component, showing a corresponding ball part in dashed lines.

Figure 1:
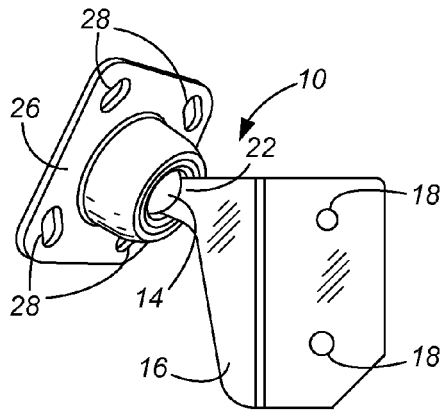
FIG. 1 is a perspective view of a first preferred embodiment of a snap assembly friction hinge of the present invention.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

Preferred embodiments of snap assembly friction hinges 10 of the present invention are shown in FIGS. 1-4. In these embodiments, the friction hinge 10 is of a ball-and-socket type, which permits the hinge joint to pivot about a pivot point 12 defined by the center of a generally spherical ball 14. The embodiments of FIGS. 1 and 2 utilize a single joint.

The ball 14 is supported from a bracket 16, depicted with two screw holes 18. The bracket 16 allows the snap assembly friction hinge 10 to be secured to a support surface such as the dashboard of a vehicle (not shown). If desired, the bracket 16 may be formed of bent sheet metal, with the ball 14 attached to the flat material of the bracket 16.

The ball 14 is received in a socket cup 20 which itself defines a generally spherical interior for the ball 14. The bracket 16 is attached to the ball 14 by a mount portion 22 which extends through the opening 24 defined by the socket cup 20. The size of the mount portion 22 relative to the size of the opening 24 determines the amount of positionability or range of angular motion of the friction hinge 10.

On its exterior, the socket cup 20 is further attached to a device support flange 26. The preferred device support flange 26 includes four screw holes 28 to enable the device support flange 26 to be secured to a device (not shown) such as a mirror, or a screen device such as a GPS, PDA or cell phone device, or a holder for any of these devices. Alternatively the exterior of the socket cup 20 can be attached to any structure which needs to be supported as known in the art. Further, reversal of the bracket 16 and the device support flange 26 is equally possible and inconsequential to the invention. In other words, though the preferred embodiments have a stationary ball 14 and a socket cup 20 which pivots and moves with the supported device, the present invention can be equally used with a stationary socket cup 20 and a ball 14 which pivots and moves with the supported device.

The socket cup 20 enables the device support flange 26 to pivot in pitch, roll and yaw about the center 12 of the ball 14. The socket cup 20 includes an outer, comparatively rigid and inflexible socket cup substrate 28 and an inner, comparatively compressible and elastomeric socket sleeve 30. The socket cup 20 provides a friction bearing surface 32 which bears against the outside surface 34 of the ball 14. The interaction between the friction bearing surface 32 of the socket cup 20 and the outside surface 34 of the ball 14 causes the friction hinge 10 to not be free swinging but rather to ordinarily maintain a fixed position of the device support flange 26 relative to the bracket 16, even during movement and vibration of the vehicle. The friction force can be overcome by hand pressure when the user desires to reposition the device support flange 26 to a different angular position.

Figure 2:
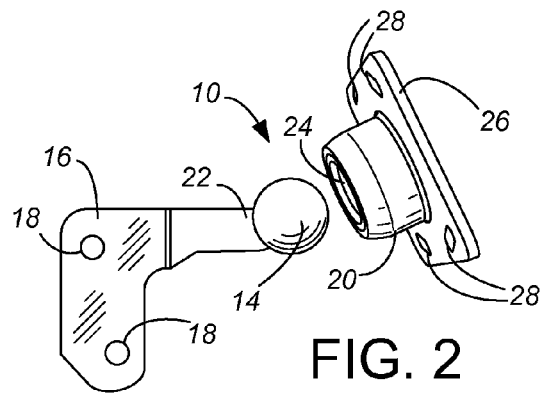
FIG. 2 shows an exploded assembly view of a second preferred embodiment similar in construction to the snap assembly friction hinge of FIG. 1.
Figure 5:
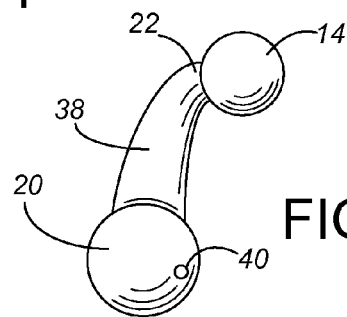
FIG. 5 shows the intermediate component of the mount of FIGS. 3 and 4.

The snap assembly portion of the invention is shown in the comparison between FIGS. 1 and 2. The term "snap assembly", as used herein, denotes that the friction hinge 10 is primarily made up of two components (a base member and a hinged member) which attach together such as through a snap fit, such that assembly of the hinge 10 does not rely on a hinge pin or other component which is longitudinally inserted separate from the base member and the hinged member. The present invention could be formed in a cylindrical configuration to permit a single hinge degree of freedom, including having a cross-sectional view of the cylindrical layout which is substantially identical to the cross-sectional views of FIGS. 9 and 10. However, the preferred embodiment involves a ball-and-socket type of joint which enables the hinged member to pivot in all directions relative to the base member.

Figure 3:
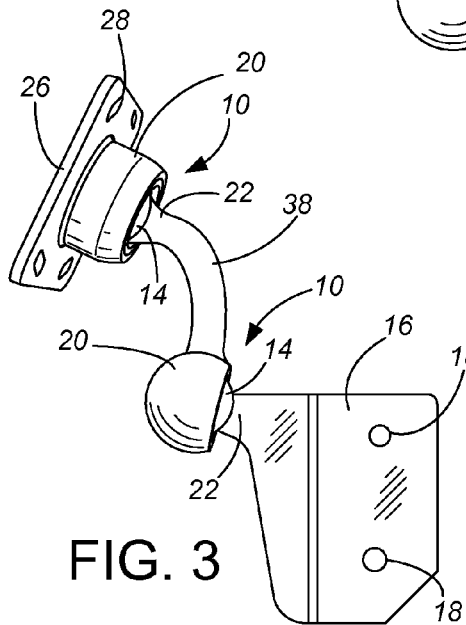
FIG. 3 is a perspective view of a third preferred embodiment mount which utilizes two snap assembly friction hinges of the present invention.
Figure 4:
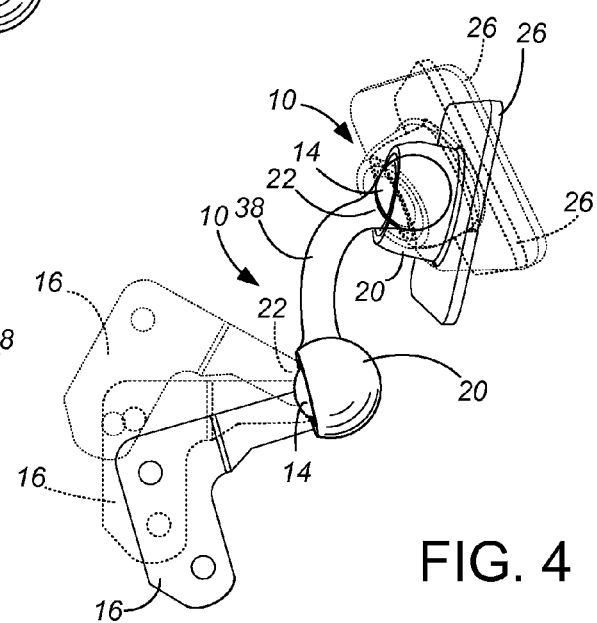
FIG. 4 shows the two ranges of freedom provided by the two hinged joints of the embodiment of FIG. 3.
Figure 6:
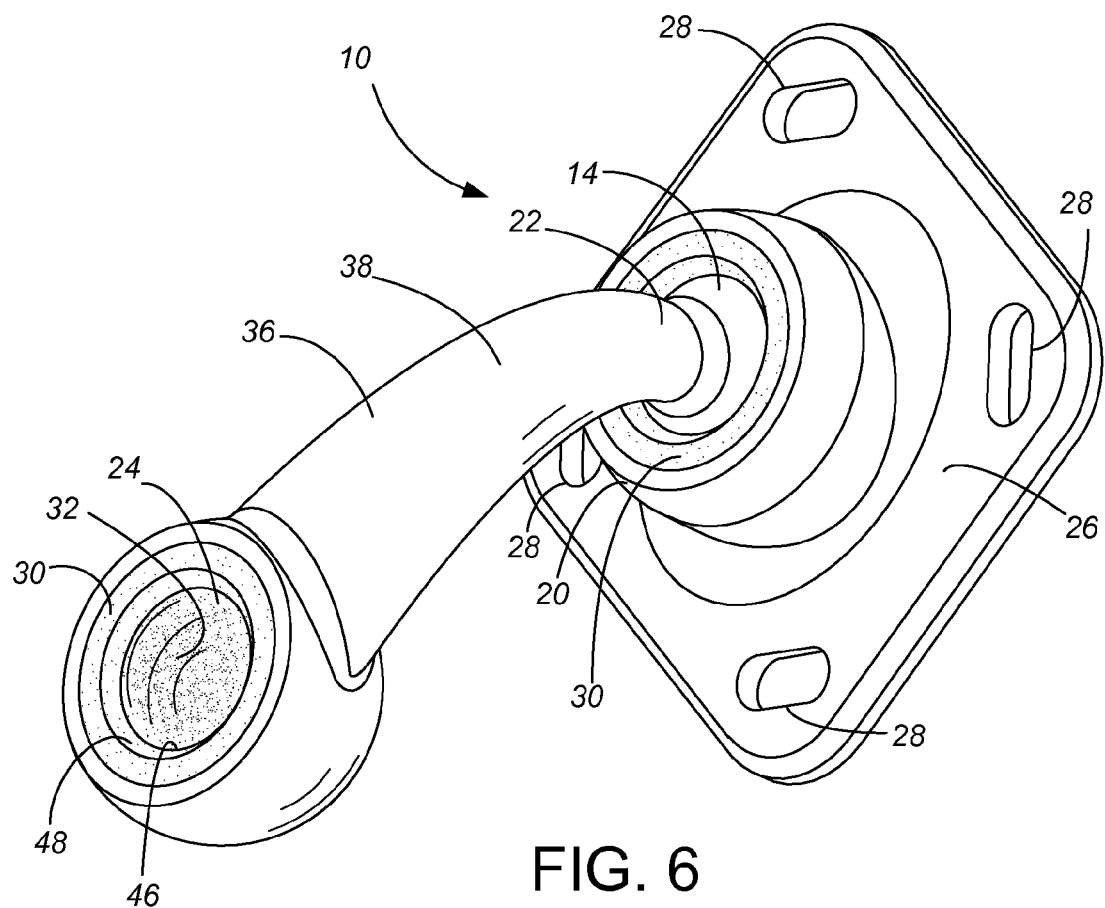
FIG. 6 is a perspective view of the intermediate and end components of the mount of FIGS. 3 and 4.

The embodiment shown in FIGS. 3 and 4 includes two of the preferred snap assembly friction hinges 10 provided through an intermediate member 36 further shown in FIGS. 5-10. The intermediate member 36 includes a socket cup 20 on one end and a ball 14 on the opposite end, with an arm 38 connecting the socket cup 20 to the ball 14.

The socket cup 20 further includes an air hole 40 to allow air flow out of the socket cup 20 during insertion of the ball 14 into the socket cup 20. The air hole 40 should extend through both the insert sleeve 30 and the cup substrate 28 but need not be the same size or shape in each. If desired, the air hole 40 could be further used to hold one or more electrical wires (not shown), which can be integrally formed through the ball 14 to enable an electrical connection through the friction hinge 10.

The detailed construction of the socket cup 20 is best shown in FIGS. 9 and 10. The cup substrate 28 has a hemispherical inside radius 42 connected to a generally cylindrical inside surface 44. If desired for ease of molding, the cylindrical inside surface 44 may be drafted.

The hemispherical inside radius 42 and the cylindrical inside surface 44 make up the bonding area for the insert sleeve 30. While numerous other shapes could be used for the interior of the cup substrate 28, the cup substrate 28 must not have an overhang which would prevent insertion and removal of the ball 14 through the opening 24. In other words, in contrast to many prior art ball-and-socket joint constructions wherein the ball is inserted from behind the device support flange, assembly of the snap assembly friction hinge 10 of the present invention involves inserting the ball 14 from the front of the device support flange 26 with the ball 14 passing through the opening 24. The cup substrate 28 must not have an overhang which would interfere with this snap assembly.

The interplay between the inside radius of the cup substrate 28, the thickness of the socket sleeve 30 and the outside radius of the ball 14 are critical in the functionality of the snap assembly friction hinge 10. In the preferred embodiment, both the hemispherical inside surface 42 and the cylindrical inside surface 44 are 10.41 mm in radius. The air hole 40 need only be large enough for air to escape during insertion of the ball 14 and to enter during removal of the ball 14. The thickness or outside diameter of the cup substrate 28 is not particularly important so long as the cup material is sufficiently thick so the cup substrate 28 is relatively unbendable and strong during insertion and removal of the ball 14 from the socket cup 20 and amply strong to withstand the vibration forces and hand repositioning forces of the friction hinge 10.

The insert sleeve 30 extends more than hemispherical, i.e., wraps around more than a hemisphere of the corresponding ball 14 as inserted, so as to provide a lip 46 for compressibly securing the ball 14 into the socket 20. The lip 46 defines an opening 24 through which the ball 14 must pass during assembly or disassembly of the friction hinge 10. While assembled, the mount portion 22 extends through the opening 24. Thus, in the cross-sectional view of FIGS. 9 and 10, the lip 46 must extend more than 180 degrees around the center of rotation 12 so the lip 46 holds the ball 14 in the socket cup 20. In more detail, in a cross-sectional view the lip 46 of the insert sleeve 30 should define a wrap angle $\theta$ of between 210 and 270 degrees around the center of rotation 12, with the most preferred wrap angle $\theta$ having the lip 46 of the insert sleeve 30 extending between 240 and 250 degrees around the center of rotation 12. In the preferred embodiment, this leaves the preferred size of the opening 24 at 6.93 mm.

A preferred elastomeric material is resilient and impact-resistant, which does not easily or substantially compression set even under thermal cycling. For instance, thermoplastic elastomer materials with a durometer less than 95 Shore A can be used for the insert sleeve 30. The preferred elastomeric material for the insert sleeve 30 is a halogenated ethylene interpolymer elastomer with a durometer between 55 and 65 Shore A. Such a halogenated ethylene interpolymer elastomer composition is commercially available from DuPont under the trademark "ALCRYN".

For the lip 46 to effectively hold the ball 14 into the socket cup 20, the insert sleeve 30 must be secured to the socket cup substrate 28. While other types of joining such as an adhesive or epoxy bond might be acceptable, the preferred method of joining the insert sleeve 30 to the cup substrate 28 is by overmolding. The overmolding process is inexpensively achieved in a mass production process and results in a long lasting, secure connection between the insert sleeve 30 and the socket cup substrate 28.

The substrate material should be substantially harder than the elastomeric sleeve 30, such that substantially no bending of the cup substrate 28 occurs during insertion and removal of the ball 14 from the socket cup 20. This is in contrast to many prior art ball-and-socket designs, wherein the socket is formed of multiple parts or arms which are assembled or formed around the ball or which bend outward relative to each other to enable the ball to be snapped into the socket. While metal parts could be used, a preferred substrate material is a moldable polymer resin which can be joined to the elastomeric insert sleeve 30 in the overmolding process. One such material is an ABS resin composition commercially available from DuPont under the trademark "CYCOLOY". For example, the cup 28 and the insert sleeve 30 of the intermediate component 36 can be formed with a multi-unit die set with P-20 mold cavities, hardened S-7 cores, a tab gate for the substrate 28, a cashew gate for the overmolded sleeve 30, and pin ejection, for a relatively low cost and an expected part volume of 500,000 shots.

A center portion, which is a ball 14 in the preferred ball-and-socket joint, is separately formed from the socket 20 but can be assembled into the socket 20 by snapping it into place. The ball 14 should be should be substantially harder than the elastomeric sleeve 30. Particularly beneficial for embodiments having the intermediate component 36, the ball 14 can be formed of the same polymer material as the cup substrate 28. In the preferred embodiment, the ball 14 is solid. While the ball 14 need not be solid, it should be sufficiently strong that substantially no bending of the ball material occurs during insertion or removal of the ball 14 from the socket cup 20. This is in contrast to many prior art ball-and-socket designs, wherein the ball is formed of multiple arms which bend inward relative to each other to enable the ball to be snapped into the socket.

During pivoting of the hinge 10, the ball 14 interacts with the insert sleeve 30 across a friction interface. In the preferred embodiment, the ball 14 is molded with a surface finish of 600 stone, which interacts with a surface finish on the inside 32 of the insert sleeve 30 of 320 stone. This frictional engagement works under the steady compressive force of the ball 14 compressing the insert sleeve 30 outward toward the cup substrate 28. More specifically, the ball 14 should dimensionally compresses the insert sleeve 30 against the cup substrate 28 to between 50 and 95 percent of its uncompressed thickness, with a preferred amount of dimensional compression being between 80 and 90 percent of its uncompressed thickness. In the preferred embodiment, the ball 14 has an outer radius of 8.51 mm interacting with the as-molded inner radius of the insert sleeve 30 of 8.19 mm and the molded inner radius of the cup of 10.41 mm. This leaves the sleeve 30 with an as-molded wall thickness of 2.22 mm (the lip 46 of the sleeve 30 is thicker than the 2.22 mm wall thickness) and an after-assembly thickness of about 1.9 mm, i.e., a dimensional compression factor during use of about 15%. The term "dimensional compression", as used herein, refers to an amount of compression which is measurable relative to the size tolerances of the components, i.e., not merely some minute amount of compression which necessarily occurs whenever two objects contact each other, but rather a larger amount of compression which can be used as a design objective to control the normal friction force caused by such compression. The amount of compression and compression factor of the sleeve 30 significantly control the frictional force within the hinge 10, and different thickness of sleeves 30 and different amounts of interference between the as-molded inner diameter of the sleeve 30 and the outer diameter of the ball 14 will control how hard the hinge 10 is to work. The 0.32 mm, 15% interference of the preferred embodiment has been found to provide a friction force appropriate for a hand held device in the operating vibrations encountered in a moving vehicle; if the compression hinge 10 is designed for other applications (such as a hinge for a laptop screen for example), a different amount of interference or compression factor may be designed in as appropriate.

With the sleeve 30 extending more than a hemisphere around the ball 14, the lip 46 functions to hold the ball 14 into the socket 20 and to simultaneously ensure a consistent compression of the insert sleeve 30. In other words, the lip 46 functions to ensure that the ball 14 is always positioned exactly so the center of the ball 14 is at the center of the cup 20, during each assembly and each repositioning of the friction hinge 10. During assembly, the ball 14 has to compress the lip 46 of the sleeve 30 radially outward by pushing against a conical portion 48 into the cup substrate 28. The outward compression of the lip 46 during assembly should occur with an assembly push force of at least 5 pounds. In the preferred embodiment, the conical portion 48 has a cone angle $\phi$ of 70°. During snap assembly, the ball 14 should increase the opening size to between 110 and 150% of the uncompressed opening size, and more preferably to between 120 and 125% of the uncompressed opening size. With the preferred opening 24 of 6.93 mm, the preferred 8.51 mm ball 14 increases the opening size to 122.8% of the uncompressed opening size.

During disassembly, the ball 14 has to pull the lip 46 of the sleeve 30 radially outward, which should occur with a disassembly pull force of at least 5 pounds. With the preferred geometry of the lip 46 as detailed in the figures, and using the overmolded insert sleeve 30 of the preferred materials, Applicant estimates the assembly push force to be about 70 pounds and the disassembly pull force to be about 40 pounds. By modifying the materials or geometry of the hinge 10, the assembly push force and disassembly pull force can be controlled for proper ease of assembly/disassembly, such as when the user would frequently desire to assemble the hinge 10 when entering the vehicle and disassemble the hinge 10 to take a device from its holder when leaving the vehicle.

In the preferred embodiment, prototypes have been formed which provide a very consistent friction pivot force required to work the hinge 10 across a wide range of temperatures such as witnessed in a vehicle parked outside with the changes in temperature from at least about 0° F. to 80° F., without significant compression set weakening of the friction force required to work the hinge 10.

Thus it will be understood that the ball 14 of the preferred ball-and-socket hinge 10 allows movement in all directions. The insert sleeve 30 acts as the bearing surface, adding frictional resistance to movement. The cup substrate 28 provides a rigid structure around the insert sleeve 30, containing it, so that the compressible material of the insert sleeve 30 exerts greater contact pressure on the ball 14. The dimensional compression factor of the insert sleeve 30 is controlled by design selection of the amount of interference, to provide a consistent friction force over a widely varying time and temperature environment.

The preferred hinge 10 provides a low cost, reliable means of displaying and adjusting the position of electronic devices or mirrors in an automobile. The hinge 10 creates a pivot which is easily moved while providing enough friction to maintain its position under varying environmental circumstances. One of the biggest advantages is that the invention utilizes few parts and uses a manufacturing process suited for low cost, high volume production.

Although the present invention has been described with reference to preferred embodiments, workers skilled in the art will recognize that changes may be made in form and detail without departing from the spirit and scope of the invention.

The invention claimed is:

1. A snap assembly friction hinge comprising:
 a compressible elastomer insert sleeve having a lip around an opening;
 a cup substrate around the insert sleeve, with the insert sleeve joined to the cup substrate such that the lip of the insert sleeve extends more than 180 degrees around a center of rotation with the cup substrate not having an overhang, the cup substrate being substantially rigid relative to the compressible elastomer of the insert sleeve;
 a center portion sized to fit into the opening through compression of the insert sleeve against the cup substrate with substantially no bending of the cup substrate, the center portion having a frictional bearing surface against the insert sleeve, the center portion being sized to fit within the insert sleeve with dimensional compression of the insert sleeve to create a friction interface between the center portion and the insert sleeve; and
 a mount portion extending from the center portion, the mount portion and center portion being movable relative to the insert sleeve and cup substrate about the center of rotation by hand application of force on the mount portion sufficient to overcome friction created in the friction interface between the center portion and the insert sleeve.

2. The hinge of claim 1 wherein the insert sleeve is overmolded to the cup substrate.

3. The hinge of claim 2, wherein the cup substrate is molded of polymer, and wherein the center portion and the mount portion are molded of polymer separate from the cup substrate.

4. The hinge of claim 1, wherein the cup is spherical and wherein the center portion is spherical.

5. The hinge of claim 4, wherein the insert sleeve is spherical.

6. The hinge of claim 1, wherein the lip of the insert sleeve extends between 210 and 270 degrees around the center of rotation.

7. The hinge of claim 6, wherein the lip of the insert sleeve extends between 240 and 250 degrees around the center of rotation.

8. The hinge of claim 1, wherein the insert sleeve has an uncompressed thickness, and wherein the center portion dimensionally compresses the insert sleeve against the cup substrate to between 50 and 95 percent of its uncompressed thickness.

9. The hinge of claim 8, wherein the center portion dimensionally compresses the insert sleeve against the cup substrate to between 80 and 90 percent of its uncompressed thickness.

10. The hinge of claim 1, wherein the opening defined by the lip has an uncompressed opening size, and wherein, during snap assembly, the center portion increases the opening size to between 110 and 150% of the uncompressed opening size.

11. The hinge of claim 10, wherein, during snap assembly, the center portion increases the opening size to between 120 and 125% of the uncompressed opening size.

12. The hinge of claim 1, wherein the insert sleeve includes an air vent, and wherein the cup substrate includes an air vent, to enable air to escape from within the insert sleeve while the center portion is being inserted through the opening.

13. The hinge of claim 1, wherein the insert sleeve is formed of a thermoplastic elastomer with a durometer less than 95 Shore A.

14. The hinge of claim 1, wherein the insert sleeve is formed of halogenated ethylene interpolymer elastomer with a durometer between 55 and 65 Shore A.

15. The hinge of claim 1, wherein the insert sleeve is overmolded with a surface roughness on its inside surface of about 320 stone, which interacts with a surface finish on an outside surface of the center portion of about 600 stone.

16. A method of forming components for a snap assembly friction hinge, the method comprising:
 molding a center portion of a joint, the center portion having an outside diameter providing an outside frictional bearing surface;
 molding a cup substrate defining a center of rotation of the joint, the cup substrate having an opening larger than the outside diameter of the center portion; and
 overmolding an insert sleeve to the cup substrate, the insert sleeve having a lip that extends more than 180 degrees around the center of rotation, the insert sleeve being substantially compressible relative to the material of the center portion and the cup substrate, the insert sleeve having an uncompressed inside diameter which is smaller than the outside diameter of the center portion and which provides an inside frictional bearing surface;
 such that the center portion can be snap assembled through the opening into the insert sleeve and cup substrate to form a friction hinge thereby dimensionally compressing the insert sleeve against the cup substrate with substantially no bending of the cup substrate or center portion to create a friction interface between the center portion and the insert sleeve.

* * * * *